United States Patent [19]

MacArthur

[11] 4,093,388
[45] June 6, 1978

[54] TIE ROD ASSEMBLY FOR VEHICLES

[75] Inventor: Robert I. MacArthur, Saginaw, Mich.

[73] Assignee: General Motors Corporation, Detroit, Mich.

[21] Appl. No.: 635,682

[22] Filed: Nov. 28, 1975

[51] Int. Cl.² ............................................. F16B 17/06
[52] U.S. Cl. ...................................... 403/46; 403/284; 403/320
[58] Field of Search ....................... 403/43, 44, 45, 46, 403/47, 48, 320, 284; 151/21 C, 21 R, 21 B; 29/175 R

[56] References Cited

U.S. PATENT DOCUMENTS

| 2,008,227 | 7/1935 | Reilly | 403/284 |
| 2,910,983 | 11/1959 | Everett | 403/284 X |
| 3,229,999 | 1/1966 | Storch | 403/44 |
| 3,583,052 | 6/1971 | Herbenar et al. | 403/43 |
| 3,801,207 | 4/1974 | Herbenar | 403/46 |

FOREIGN PATENT DOCUMENTS

| 277,955 | 9/1930 | Italy | 29/175 R |

Primary Examiner—Andrew V. Kundrat
Attorney, Agent, or Firm—Charles R. White

[57] ABSTRACT

A one-piece tie rod adjuster comprises a cylindrical sleeve internally threaded as a turnbuckle to engage with corresponding threads of inner and outer tie rods and rotatable to adjust the overall length of the assembled linkage. The sleeve is provided with laterally spaced and circumferential beads which can be constricted and compressed after the linkage adjustment. As a result of bead compression the sleeve elongates and takes a permanent set to preload the threaded connection to secure the threaded assembly in adjusted position.

3 Claims, 3 Drawing Figures

U.S.Patent  June 6, 1978  4,093,388

TIE ROD ASSEMBLY FOR VEHICLES

This invention relates to steering linkages and more particularly to a new and improved tie rod assembly including a one-piece adjuster sleeve operatively connecting a pair of tie rods together.

Prior to the present invention, inner and outer tie rods in many vehicle steering linkages have been coupled by a slotted adjuster sleeve threaded onto adjacent ends of the tie rods. This sleeve can be turned in either direction to adjust tie rod length to vary the front wheel geometry of a vehicle. Usually circular clamps with radially projecting terminal jaws that receive bolt and nut fastener means are employed to tighten and secure the adjuster sleeve in position after the tie rod adjustment has been made. With such construction many parts had to be handled and installed for each linkage. Furthermore, the various parts of these constructions are difficult to install since they had to be positioned in particular relationships with respect to each other for the most effective clamping. In addition, the prior art constructions are bulky and add to overall vehicle weight.

In this invention the prior art multipart clamping assembly for inner and outer tie rods has been replaced by a new and improved one-piece adjuster sleeve. This sleeve can be readily formed from tubular metallic stock and internally threaded with right and left hand threads to mate with corresponding threads on the inner and outer tie rods. The sleeve can be used as a turnbuckle to adjust the overall length of the tie rods to change the geometry of the dirigible wheels of the vehicle. After tie rod adjustment, integral constrictable beads provided in the sleeve, are preferably radially deformed inwardly by suitable tooling so that the sleeve will elongate and stretch in opposite directions from the constricted beads. By exceeding the elastic limit in response to bead constriction, the sleeve takes a permanent set which results in an effective preload on the threaded connection to thus secure the tie rods to the sleeve. If additional adjustment is subsequently needed, suitable tooling can be used to turn the adjuster sleeve to change front wheel geometry as required without detracting from sleeve operation. The adjuster sleeve of this tie rod assembly is a compact, lightweight member which provides savings in costs and weight as compared to many prior art constructions.

A feature, object and advantage of this invention is to provide a new and improved tie rod assembly featuring a one-piece adjuster sleeve for adjustably and securely connecting the tie rods of the assembly together.

Another feature, object and advantage of this invention is to provide a new and improved steering linkage having a tubular, lightweight adjuster sleeve operatively connecting the tie rods of the linkage, having integral beads which can be radially constricted to laterally load the threaded connection between the adjuster sleeve and tie rods to secure these parts together.

These and other features, objects and advantages of this invention will be more apparent from the following detailed description and drawing in which.

Figure 1:
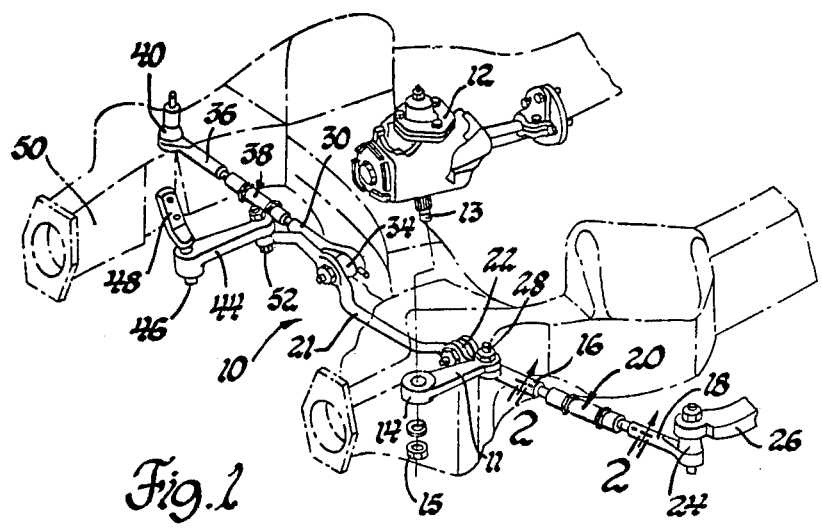
FIG. 1 is a perspective view with some parts exploded of a vehicle steering linkage and an associated steering gear.

Turning now in greater detail to the drawing, there is shown in FIG. 1 a parallelogram type steering linkage 10 operatively connecting the dirigible wheels of a vehicle (not shown) to the pitman arm 11 of a power steering gear 12. The power steering gear has rotatable output shaft 13 which is splined to the hub 14 of the pitman arm 11 and is secured thereto by nut means 15. The steering linkage 10 comprises left inner and outer tie rods 16 and 18 adjustably interconnected by a one-piece, cylindrical sleeve 20. The left inner tie rod 16 is pivotally connected to an elongated relay rod 21 adjacent to one end thereof by pivot connection 22 while the left outer tie rod 18 is pivotally connected by pivot 24 to a steering knuckle arm 26 operatively connected to the left front wheel (not shown).

The relay rod 21 is actuated by pitman arm 11 which has its outer end pivotally connected to one end of the relay rod by pivot 28. The relay rod 21 extends laterally and is pivotally connected to a right inner tie rod 30 by pivot connection 34. The right inner tie rod 30 is drivingly connected to an outer right tie rod 36 by a cylindrical adjuster sleeve 38 which corresponds to sleeve 20 on the left side of the vehicle. The terminal end of tie rod 36 is connected by pivot connection 40 to a right side steering knuckle arm operatively connected to the right front wheel of the vehicle (not shown). In addition to the tie rods, the relay rod and associated components just described, the steering linkage further comprises an idler arm 44 having a hub connected by a pivot 46 to a bracket 48 which is in turn fastened to the right side rail 50 of the vehicle frame. The outer end of the idler arm 44 is connected by pivot 52 to the adjacent end of relay rod 21.

Figure 2:
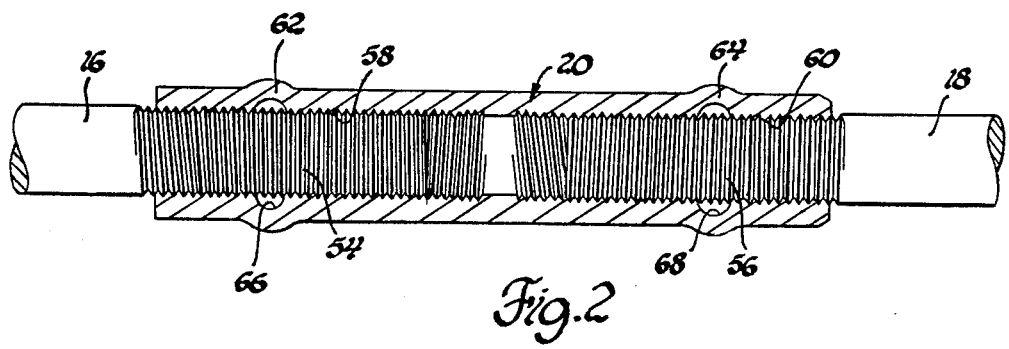
FIG. 2 is a view taken generally along line 2—2 of FIG. 1 showing tie rods and an adjuster sleeve prior to deformation of radial beads on the adjuster sleeve.

The left and right adjuster sleeves 20 and 38 are similar so only adjuster sleeve 20 will be described in detail it being understood that the description of the adjuster sleeve 20 could be used for that of adjuster sleeve 38. As shown best in FIG. 2 the left inner and outer tie rods 16 and 18 have end portions 54 and 56 respectively formed with external threads of opposite leads which have flank engagement with corresponding internal threads 58 and 60 formed in adjuster sleeve 20. The adjuster sleeve 20 is fabricated from tubular stock of a suitable material such as low carbon steel and cut to a predetermined length. Radial beads 62 and 64 laterally spaced from each other are swaged in the tubular stock adjacent to opposite end portions thereof to provide deformable means for securing the tie rods to the adjuster sleeve as will be later described. Preferably there is no substantial variation of the thickness of the wall of the sleeve as a result of bead formation. As shown best in FIG. 2 the beads 62 and 64 swaged in sleeve 20 form internal annular arches 66 and 68 respectively to provide small discontinuities in the corresponding internal threads 58 and 60.

The tie rods and associated adjuster sleeve can be initially assembled by screwing the tie rods 16 and 18 into the sleeve 20 a substantial distance past their respective beads 62 and 64. This assembly is done at low torque since initially there is only a clearance fit involved. With the steering linkage assembly installed on the vehicle, the adjuster sleeves can be readily turned with suitable tools to adjust front wheel geometry as needed. For example, sleeve 20 may be rotated forwardly as a turnbuckle to increase the overall length of the tie rods and rotated rearwardly to decrease tie rod length.

Figure 3:
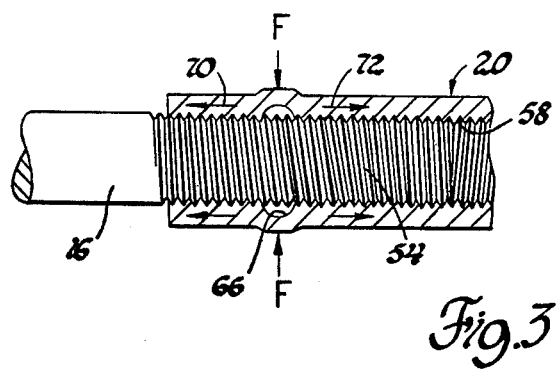
FIG. 3 is a view similar to that of FIG. 2 illustrating the interlocking of threaded components by deformation of the radial beads of the adjuster sleeve.

After the tie rod adjustments have been made to position the front wheels of the vehicle, the beads 62 and 64 are preferably compressed inwardly by constricting force F to reduce their diameters. As best shown in FIG. 1 the beads are compressed into a polygonal shape to provide a wrench surface on the adjuster sleeve for toe alignment in the field. More importantly the compression of the beads causes the sleeve 20 to elongate in either direction away from the bead arches 66 and 68 as diagrammatically illustrated by arrows 70 and 72 in FIG. 3. By exceeding the elastic limit as a result of bead constriction, the adjuster sleeve 20 takes a permanent set which results in an effective laterally directed preload on the threaded connection between the two tie rods and the adjuster sleeve. If it is subsequently desired to further adjust the front wheel geometry, the sleeve can be turned with the application of a higher breakaway torque to provide for the appropriate adjustment. In the event that increased retention forces are desired to secure the sleeve in the readjusted position, the beads can be further constricted to increase the lateral loading of the threads.

From the above it will be appreciated that this tie rod assembly incorporates a simplified adjuster sleeve with improved retention means to maintain the threaded adjustment. In view of the one-piece construction of the sleeve from tubular stock a substantial savings in cost and weight is provided as compared to prior art constructions. The adjuster sleeve of this invention can be easily installed and turned to properly adjust tie rod linkages where multipart adjusters are employed. After being set in the adjusted position as described above, additional adjustment can be made with the application of the appropriate torque to the adjuster sleeve without detracting from its operability.

While a preferred embodiment of this invention has been shown and described to illustrate the invention, other embodiments will now be apparent to those skilled in the art. Accordingly, the scope of this invention is not limited to that which has been shown and described for illustration purposes, but only by the following claims:

I claim:

1. A tie rod assembly in a vehicle steering linkage comprising inner and outer tie rod members, said tie rod members having end portions space from each other, one of said end portions having a peripheral thread of a right-hand lead, the other of said end portions having a peripheral thread of a left-hand lead, an adjuster sleeve extending between said tie rod members, said sleeve being a tubular member of deformable metal with complementary right and left hand internal threads that engage the respective right and left hand threads of said end portions of said tie rod members, said adjuster sleeve being rotatable relative to said tie rod members to adjust the overall length of said tie rod members connected thereto, said adjuster sleeve having radially projecting bead means integral with the walls thereof encircling and located radially outwardly of said tie rods and inboard of the ends thereof, said bead being partially constricted radially inwardly to reduce its diameter and longitudinally displace material of said sleeve and thereby laterally load the engaged threads to maintain the tie rods and sleeve in an adjusted position.

2. A tie rod assembly for a vehicle steering linkage comprising inner and outer tie rod members having end portions spaced from each other, one of said end portions having a peripheral thread of a right-hand lead, the other of said end portions having a peripheral thread of a left-hand lead, an adjuster sleeve extending between said rod members, said sleeve being a cylindrical body with complementary right-hand and left-hand internal threads which engage the respective right-hand and left-hand threads on said end portions of said tie rod members, said adjuster sleeve having annular and laterally-spaced peripheral bead means formed directly in the walls of said cylindrical body and projecting radially outwardly thereform, said bead means having a wall thickness no greater than the wall thickness of said sleeve and being located inwardly of the sleeve ends and circumscribing said end portions of said tie rod members, said bead means being partially constricted radially inwardly to longitudinally displace the material of said cylindrical body to compressively load the threaded connection between said tie rod members and said adjuster sleeve to tightly secure said adjuster sleeve to said tie rod members.

3. A tie rod assembly for a vehicle steering linkage comprising inner and outer tie rod members having end portions spaced from each other, one of said end portions having a peripheral thread of a right hand lead, the other of said end portions having a peripheral thread of a left hand lead, an adjuster sleeve extending between said rod members, said sleeve being a cylindrical metallic member with complementary right hand and left hand internal threads which engage the respective right hand and left hand threads on said end portions of said tie rod members, said adjuster sleeve having spaced and annular peripheral bead means located inwardly of the sleeve ends and formed in the walls thereof, said bead means being inboard of the end portions of said tie rod members and radially deformable to compressively preload the threaded connection between said tie rod members and said adjuster sleeve to tightly secure said adjuster sleeve to said tie rod members and said bead means having flats thereon to provide nut means integral with said adjuster sleeve for facilitating the turning and adjustment thereof.

* * * * *